United States Patent [19]
Klosterman et al.

[11] Patent Number: 6,078,348
[45] Date of Patent: Jun. 20, 2000

[54] TELEVISION SCHEDULE SYSTEM WITH ENHANCED FEATURES

[75] Inventors: Brian L. Klosterman, San Ramon; Sean A. O'Brien, Pleasanton; Kenneth A. Milnes, Fremont; Steven M. Schein, Menlo Park; Donald Metzger, Los Altos Hills; Todd Blake, San Francisco; Gordon Chang, San Jose; David Warden, Redwood City, all of Calif.

[73] Assignee: StarSight Telecast Inc., Fremont, Calif.

[21] Appl. No.: 08/876,468

[22] Filed: Jun. 16, 1997

Related U.S. Application Data

[60] Provisional application No. 60/020,989, Jun. 17, 1996.

[51] Int. Cl.⁷ ................................................ H04N 7/10
[52] U.S. Cl. .......................... 348/10; 348/906; 348/12; 348/13
[58] Field of Search ................... 348/10, 906, 1, 348/2, 5, 6, 460; 455/6.2, 6.3, 6.1

[56] References Cited

U.S. PATENT DOCUMENTS

| | | | |
|---|---|---|---|
| 4,706,121 | 11/1987 | Young | 358/142 |
| 5,410,344 | 4/1995 | Graves et al. | 348/1 |
| 5,479,268 | 12/1995 | Young et al. | 358/335 |
| 5,552,833 | 9/1996 | Henmi et al. | 348/460 |
| 5,589,892 | 12/1996 | Knee et al. | 348/731 |
| 5,594,509 | 1/1997 | Florin et al. | 348/731 |
| 5,596,373 | 1/1997 | White et al. | 348/569 |
| 5,604,544 | 2/1997 | Bertram | 348/601 |
| 5,619,274 | 4/1997 | Roop et al. | 348/461 |
| 5,621,579 | 4/1997 | Yuen | 386/121 |
| 5,629,733 | 5/1997 | Youman et al. | 348/7 |
| 5,635,989 | 6/1997 | Rothmuller | 348/563 |
| 5,684,525 | 11/1997 | Klosterman | 348/12 |
| 5,808,608 | 9/1998 | Young et al. | 345/327 |
| 5,844,620 | 12/1998 | Coleman et al. | 348/461 |
| 5,880,768 | 3/1999 | Lemmons et al. | 348/1 |

FOREIGN PATENT DOCUMENTS

| | | |
|---|---|---|
| 0 693 854 A2 | 1/1996 | European Pat. Off. . |
| 0735749A2 | 10/1996 | European Pat. Off. ....... H04N 5/445 |
| 2 126 002 | 3/1984 | United Kingdom . |
| 93/22877 | 11/1993 | WIPO ........................... H04N 7/173 |
| WO 94/13107 | 6/1994 | WIPO . |

*Primary Examiner*—Paul R. Lintz
*Assistant Examiner*—Uyen Le
*Attorney, Agent, or Firm*—Christie, Parker & Hale, LLP

[57] ABSTRACT

A system and method for displaying an electronic program schedule guide is provided. The system has areas for displaying program schedule information. In addition, the system also has areas that may be used for displaying movie listings. The system has enhanced recording capabilities, including extending recording time, automatically rescheduling recording, and the like. Finally, the system has features which simplify the setup and installation procedures.

4 Claims, 10 Drawing Sheets

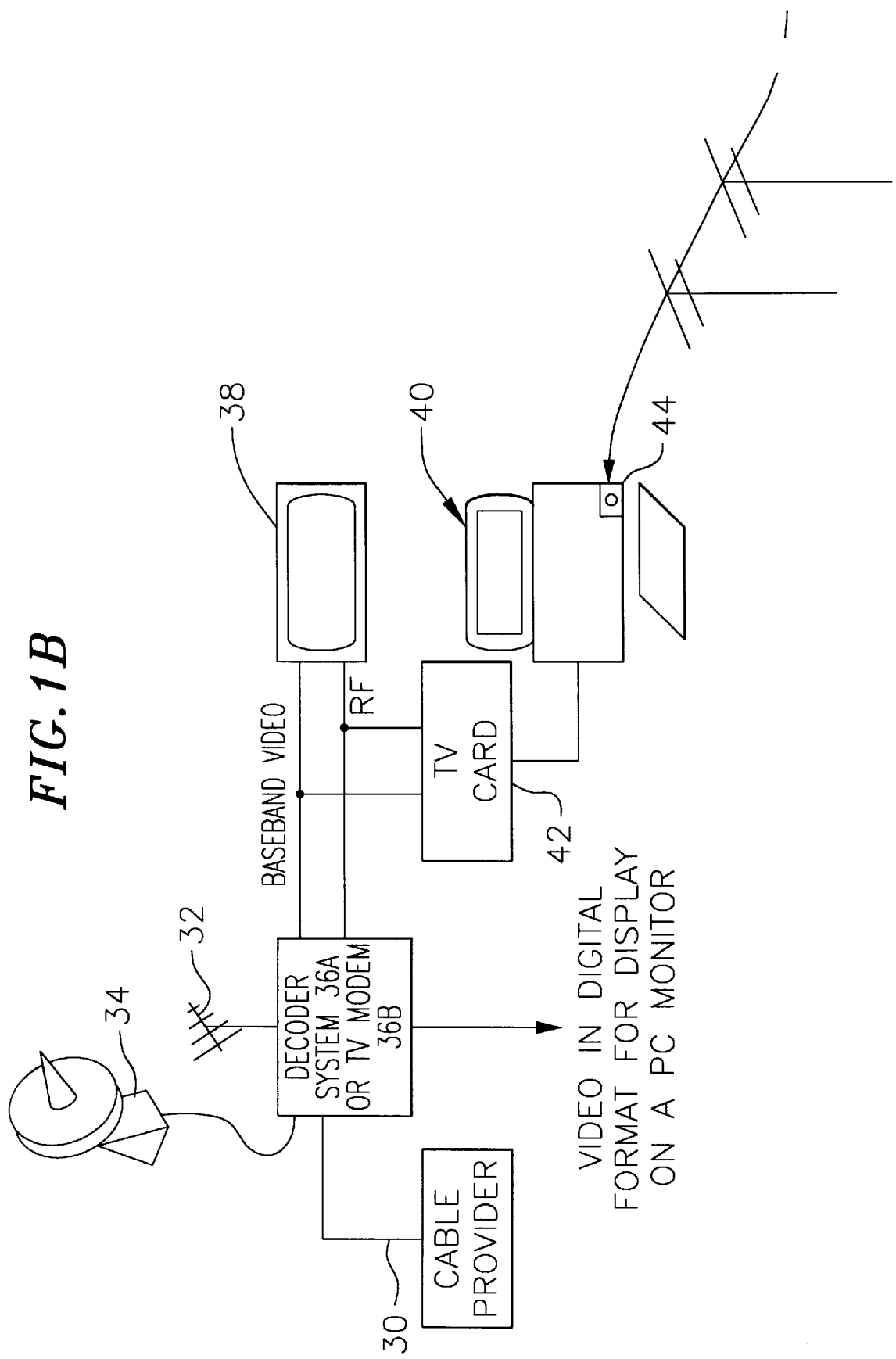

FIG. 1F

SHOW LIST

| Offset | 7 | 6 | 5 | 4 | 3 | 2 | 1 | 0 |
|---|---|---|---|---|---|---|---|---|
| 0x00 | | | | TYPE=0x02 | | | | |
| 0x01 | | | | NBR BLOCKS | | | | |
| 0x02 | | | | VERSION | | | | |
| 0x03 | MSB | | | | | | | |
| ... | | | START TIME GMT | | | | | |
| | | | | | | | | LSB |
| 0x07 | | | START DELIMITER=0xEE | | | | | |
| 0x08 | RESV | | | PPV | GRPF | DIDF | DMYF | |
| 0x09 | | | | DURATION | | | | |
| 0x0A | MSB | | | SHOW TITLE HANDLE | | | | |
| | | | | | | | | LSB |
| 0x0C | MSB | | | SHOW DESCRIPTION HANDLE | | | | |
| | | | | | | | | LSB |
| 0x0E | MSB | | | GROUP ID | | | | |
| | | | | | | | | LSB |
| ... | | | END DELIMITER=0xFF | | | | | |

Values column (right side): 0x00, 0x01, 0x02, 0x04, 0x06

FIG. 1E

CHANNEL DATA TABLE

| Offset | 7 | 6 | 5 | 4 | 3 | 2 | 1 | 0 |
|---|---|---|---|---|---|---|---|---|
| 0x00 | | | | TYPE=0x01 | | | | |
| 0x01 | | | | NBR BLOCKS | | | | |
| 0x02 | | | | 0x00 | | | | |
| 0x03 | | | | NBR CHANNELS | | | | |
| 0x04 | MSB | | | CHANNEL ID | | | | |
| | | | | | | | | LSB |
| 0x06 | DPF | ICF | NDF | | | NF | TMSB | |
| 0x07 | | | | TUNE CHANNEL NBR | | | | |
| 0x08 | | | | TRANSPONDER NBR | | | | |
| 0x09 | | | | SATELLITE NBR | | | | |
| 0x0A | | SOURCE | | CHANNEL TYPE | | | NMSB | |
| 0x0B | | | | NATIVE CHANNEL NBR | | | | |
| 0x0C | | | | NAME MASK BITS | | | | |
| 0x0D | | | | FAVORITES LINK | | | | |
| 0x0E | MSB | | | SHOWLIST HANDLE TABLE HANDLE | | | | |
| | | | | | | | | LSB |
| 0x10 | MSB | | | NAME AFFILIATION STRING | | | | |
| | | | | | | | | LSB |
| 0x18 | MSB | | | DUPLICATE CHANNELS HANDLE | | | | |
| | | | | | | | | LSB |

Values column (right side): 0x00, 0x02, 0x03, 0x04, 0x05, 0x06, 0x07, 0x08, 0x09, 0x0A, 0x0C, 0x14

FIG.1H

SHOW DESCRIPTION ENTRY

| | 7 | 6 | 5 | 4 | 3 | 2 | 1 | 0 |
|---|---|---|---|---|---|---|---|---|
| 0x00 | \multicolumn{8}{l}{TYPE=0x60 NBR BLOCKS} |
| 0x01 | CMPF | CCF | SF | BW/C | RF | REF CNT MSB'S ||||
| 0x02 | \multicolumn{8}{l}{REFERENCE COUNT} |
| 0x03 | MSB | \multicolumn{6}{c}{THEME INDEX ID} | LSB |
| 0x05 | \multicolumn{4}{l}{CRITICS RATING} | \multicolumn{4}{l}{MPAA} |
| 0x06 | \multicolumn{8}{l}{TRAITS MASK BITS} |
| 0x07 | \multicolumn{8}{l}{YEAR PRODUCED} |
| 0x08 | \multicolumn{8}{l}{SHOW DESCRIPTION TEXT} |

FIG.1G

SHOW TITLE ENTRY

| | 7 | 6 | 5 | 4 | 3 | 2 | 1 | 0 |
|---|---|---|---|---|---|---|---|---|
| 0x00 | \multicolumn{8}{l}{TYPE=0x50 NBR BLOCKS} |
| 0x01 | CMPF | CCF | SF | BW/C | RF | REF CNT MSB'S ||||
| 0x02 | \multicolumn{8}{l}{REFERENCE COUNT} |
| 0x03 | MSB | \multicolumn{6}{c}{THEME INDEX ID} | LSB |
| 0x05 | \multicolumn{8}{l}{SHOW TITLE TEXT} |

FIG. 1I

THEME CATEGORY TABLE

| offset | 7 | 6 | 5 | 4 | 3 | 2 | 1 | 0 |
|---|---|---|---|---|---|---|---|---|
| 0x00 | \multicolumn{8}{l}{TYPE=0x05} |
| 0x01 | \multicolumn{8}{l}{NBR BLOCKS} |
| 0x02 | \multicolumn{8}{l}{VERSION} |
| 0x03 | \multicolumn{8}{l}{NBR THEME CATEGORIES} |
| 0x04 | \multicolumn{8}{l}{THEME CATEGORY ID} |
| 0x05 | \multicolumn{8}{l}{ATTRIBUTES FLAG} |
| 0x06 | \multicolumn{8}{l}{MSB — THEME SUBCATEGORY} |
| 0x07 | \multicolumn{8}{l}{HANDLE TABLE — LSB} |
| 0x08 | \multicolumn{8}{l}{CATEGORY NAME LENGTH} |
| 0x09 | \multicolumn{8}{l}{MSB} |
| ... | | | | | | | | |
| 0xM | \multicolumn{8}{l}{THEME CATEGORY NAME} |

FIG. 1J

THEME SUBCATEGORY TABLE

| offset | 7 | 6 | 5 | 4 | 3 | 2 | 1 | 0 |
|---|---|---|---|---|---|---|---|---|
| 0x00 | \multicolumn{8}{l}{TYPE=0x06} |
| 0x01 | \multicolumn{8}{l}{NBR BLOCKS} |
| 0x02 | \multicolumn{8}{l}{THEME CATEGORY ID} |
| 0x03 | \multicolumn{8}{l}{NBR THEME SUBCATEGORIES} |
| 0x04 | \multicolumn{8}{l}{THEME SUBCATEGORY ENTRY LENGTH(m)} |
| 0x05 | \multicolumn{8}{l}{ATTRIBUTES FLAG} |
| 0x06 | \multicolumn{8}{l}{NBR THEME INDECIES(k)} |
| 0x07 | \multicolumn{8}{l}{MSB — THEME ID 1} |
| 0x09 | \multicolumn{8}{l}{MSB — THEME ID 2 — LSB} |
| ... | | | | | | | | |
| 6+2k | \multicolumn{8}{l}{MSB — THEME ID k} |
| 8+2k | \multicolumn{8}{l}{MSB — — LSB} |
| ... | | | | | | | | |
| 0xm | \multicolumn{8}{l}{THEME SUBCATEGORY NAME} |

TELEVISION SCHEDULE SYSTEM WITH ENHANCED FEATURES

CROSS REFERENCE TO RELATED APPLICATION

This application is a nonprovisional application of U.S. provisional patent application "TELEVISION SYSTEM WITH ENHANCED FEATURES," U.S. Ser. No. 60/020,989, filed Jun. 17, 1996, having Brian Lee Klosterman et al. as the inventors and assigned to StarSight Telecast, Inc.

BACKGROUND OF THE INVENTION

The present invention relates to a system for providing television schedule information, and more particularly to a television schedule information guide with enhanced features, thus giving a viewer more information and control when scheduling viewing of television programs.

Systems are available for providing television schedule information to a user. For example, U.S. Pat. No. B1 4,706,21 (Young), provides a television schedule system and process. In one embodiment of Young, the television schedule information is provided on the user's television screen. The user may supply selection criteria which are utilized by the Young system to make program selections, and the like. In addition, Young discloses a system which controls a television receiver to allow for automatic selection of programs and the automatic, unattended recording of programs that are listed in the television schedule information guide. The automatic, unattended recording of programs is achieved by controlling a videotape recorder (VCR) or other recording device.

Other enhanced features, however, may be desired as more television schedule systems become available and as the user gets more sophisticated. The present invention provides enhanced features such as the capability of extending recording time for programs that run over, thereby further improving the functionality of the television schedule system.

SUMMARY OF INVENTION

The present invention includes an interactive television schedule system with enhanced features. In a preferred embodiment, instead of notifying the user that there is "2 minutes left" of the current show, the system displays, for example, "in 2 minutes, the 10 O'Clock News will be on." In another preferred embodiment, the system also allows the user to hit PLAY on the VCR and set the TV to the VCR source.

In yet another preferred embodiment, the system has artificial intelligence capability, allowing it to keep track of the user's viewing habits, and make artificially intelligent solutions about what a user wants to watch, when they want to watch it, and the like. As discussed, the system may also have the capability of extending recording times for programs that run over; furthermore, it is compatible with high definition TV.

Other features and advantages of the present invention will become apparent to those skilled in the art upon a perusal of the remaining portions of the specification.

BRIEF DESCRIPTION OF THE DRAWINGS

FIG. 1B illustrates another representation of the TV system;

FIG. 1E illustrates an exemplary channel data table;

FIG. 1F illustrates an exemplary show list table;

FIG. 1G illustrates exemplary show title entries;

FIG. 1H illustrates exemplary show description entries;

FIG. 1I illustrates an exemplary theme category table;

FIG. 1J illustrates an exemplary theme sub category table;

DETAILED DESCRIPTION OF INVENTION

A. OVERVIEW OF THE SYSTEM

Figure 1A:
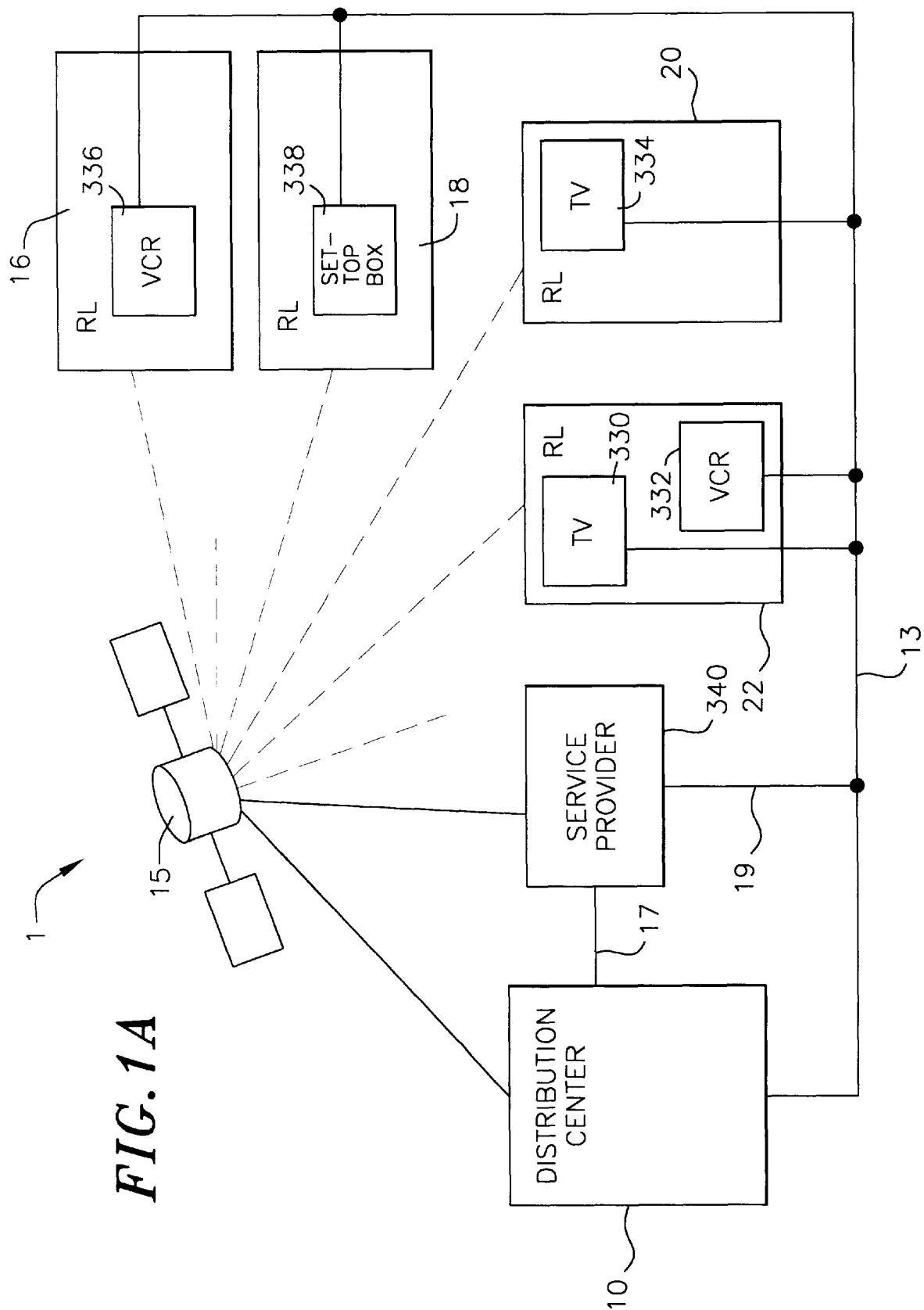
FIG. 1A illustrates a preferred embodiment of a system on which a program schedule guide according to the present invention may be displayed.

The present invention provides a television (TV) schedule system with enhanced features. FIG. 1A illustrates a preferred embodiment of television/computer system 1 that displays a program schedule guide according to the present invention. As shown, system 1 includes a distribution center 10 and multiple receiving locations. Distribution center 10 compiles data for a data stream. In a preferred embodiment, this data-stream is broadcast to receiving locations 16, 18, 20, and 22. Several methods are available for broadcasting the data-stream from distribution center 10 to receiving locations 16–22. For example, satellite 15 may broadcast this data-stream within the vertical blanking interval (VBI) of a television channel (e.g., PBS) or a dedicated channel to receiving locations 16, 18, 20, and 22. Alternatively, the data may also be broadcast out of band, i.e., using non channel specific mechanisms. In another preferred embodiment, the data-stream is provided to receiving locations 16, 18, 20, and 22 via transmission system 13. Transmission system 13 may be, for example, optical fiber, coax cable, telephone line, over the air television broadcast, or the like.

In yet another embodiment, peripheral devices, which are located within the receiving locations, receive the data-stream from, for example, a local service provider 340. Service provider 340 receives the data-stream from distribution center 10 via line 17, and broadcasts the data-stream to the receiving peripheral devices via satellite 15 (or another satellite), or via lines 19 and 13. The receiving peripheral devices may be televisions 330, televisions 334, VCRs 332, VCRs 336, and/or cable, satellite IRD, web-browser or set-top boxes 338.

Information in the data-stream may include television schedule information. Software applications located within the peripheral devices utilize the schedule information provided in the data-stream to generate a schedule guide. In a preferred embodiment, the electronic program guide of the present invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will be referred to as a "TV system". A block diagram of a representative TV system is depicted in FIG. 1B. Details of implementation are not depicted because the invention is not limited to any particular TV system.

As is well known, the picture to be displayed on a TV may be transmitted as an analog signal, for example according to the NTSC standard utilized in the United States, or as a digital signal modulated onto an analog carrier. The signals may be received over a cable 30, or via an antenna 32 or satellite dish 34. Typically, television sets are designed to receive analog signals and computers display devices are designed to display pictures encoded in a digital format. However, decoder system 36A can convert the digital data to an analog signal for display on a television set, and TV modem 36B can format analog TV signals for display on a PC monitor.

In FIG. 1B, analog or digital TV signals, received via cable, antenna, or satellite dish, are provided to either a television 38 or to a PC (not shown). If the signal is from a digital broadcast service, then a decoder converts the signal to baseband video and audio or channel 3/4 RF. If the signal is an analog signal, it is passed through as a live video output. The television, depending on its configuration, receives selected ones of the outputs and displays the received program.

If the TV is a PCTV 40, it typically includes a TV card 42, connected to either live video, baseband video, or channel 3/4 output. TV card 42 digitizes the video image and displays the video image in a resizeable window on the computer monitor. PCTV 40 may also be coupled to land telephone lines by a modem 44. If the received signal is an analog TV signal, the TV card of the PCTV digitizes the analog signal and extracts included information from the vertical blanking intervals. On the other hand, if the signal is a digital signal, separate audio, video, VBI (information such as closed caption, teletext, and program related information), program guide, and conditional access information are provided as separate bit-streams.

The video and audio bit-streams for programs are converted to a format for display and the program guide information is processed to form the program guide database. The processor, executing software stored in memory, generates interactive electronic program guide images, as well as images of received programs. The guide can be used to interact with and control programs displayed in the window.

A television system configured to display an electronic program guide such as a guide provided by StarSight telecast includes an on-screen display controller and other hardware described below. If a standard analog broadcast signal is received, program guide data is extracted from the VBI by a VBI data slicer and processed to form a program database. If a DBS digital signal is received, either from a satellite or cable, VBI and program data are provided in separate bit streams. Since the system has the capability of receiving program data in separate bit streams, the system is also compatible with the HDTV standard for high resolution graphics.

The program guide images are either generated locally or remotely and provided to an on screen display controller. Interactivity is provided via a remote control. Alternatively, the program guide can be displayed on a computer monitor that interactively controls the television set through, for example, an IR interface including an IR blaster to generate IR codes to control the television and/or a VCR.

If the electronic guide database is generated locally the system for creating the electronic programming guide must receive television schedule information and process the received information to create a database. Thus, the system requires, a data reception unit, a processor, memory to store program code and a database, an on-screen display generator (OSD), and a control interface for tuning to selected channels.

In one embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 1C:
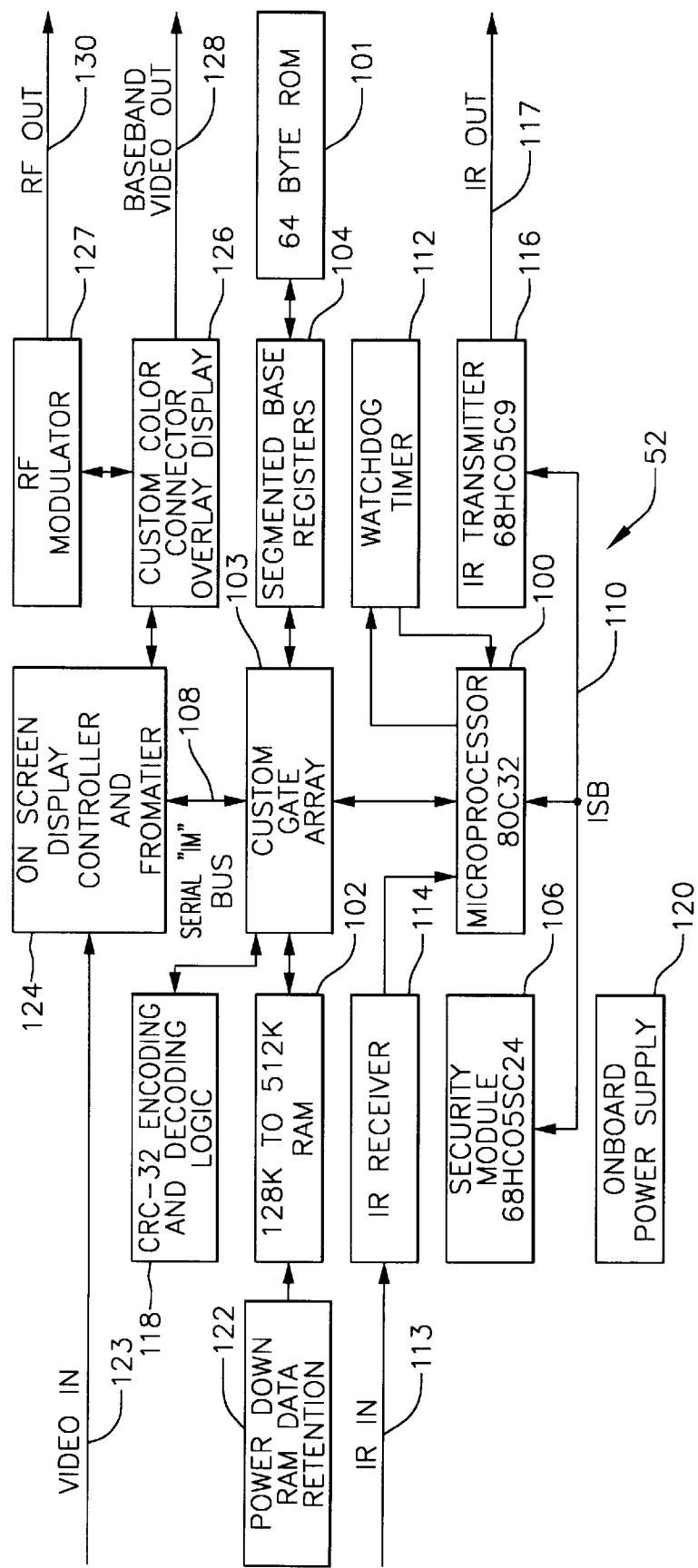
FIG. 1C is a block diagram of an embodiment of the electronic hardware unit utilized to perform the electronic on-screen schedule display and other functions.

In another embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 1C. The commands are transmitted to the board in the vertical blanking intervals of programming broadcast on a designated channel. Alternatively, the commands could be transmitted to the local unit over land telephone lines. Additionally, as described below, in some systems the database is built remotely and the guide itself is transmitted to the local unit.

Figure 1D:
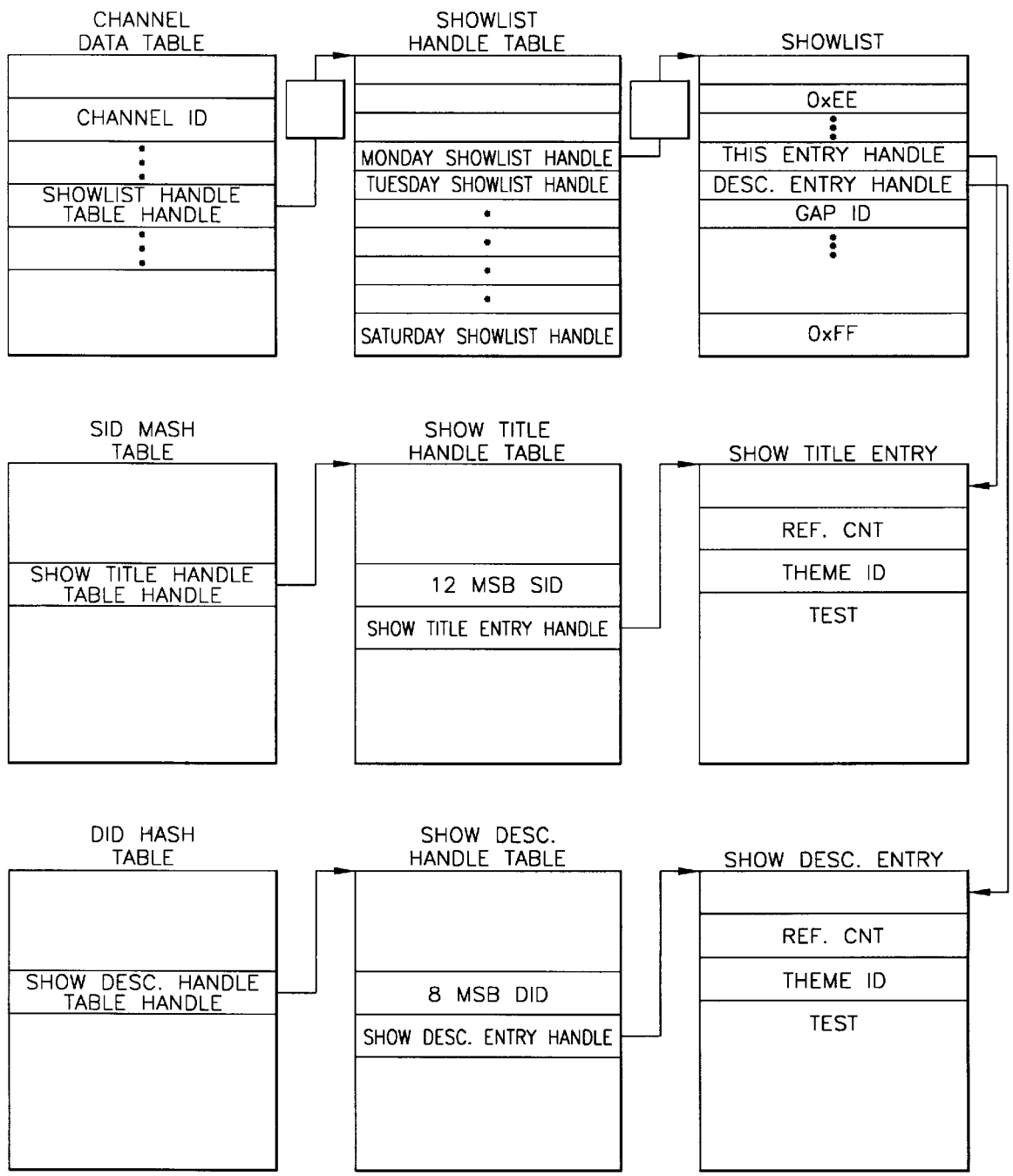
FIG. 1D is a chart that illustrates the hierarchical structure of an embodiment of a database built by the database engine.

The DBE builds a hierarchical database in the RAM. The hierarchical structure of the database is depicted in FIG. 1D. As shown, the database is structured internally as a schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine. Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement (ad) database is also created from commands including advertising text and logos including IDs for linking the ads to shows displayed in the EPG. The user may therefore access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode, the display is a grid of character codes that are transferred to the OSD controller, which generates the on-screen display.

An input-response user interface program module responds to user input to generate new displays responsive to the particular input. In one preferred embodiment, the user utilizes an input device, e.g., a remote control, mouse, or keyboard, to place a pointer over a part of the current display and clicks. The input-response module responds to the position of the pointer and the particular display currently displayed to generate a responsive display or take a particular action. In another preferred embodiment the user interface responds to function buttons on a remote control. Specific examples will be described below.

B. BROAD DESCRIPTION

FIG. 1C is a block diagram of an embodiment of the electronic hardware unit utilized to perform the electronic on-screen schedule display and other functions. The particular circuit disclosed is for TVRO (TV Receive Only) customers having home satellite dishes for television viewing. This unit is coupled in series with existing customer TVRO equipment.

In FIG. 1C, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512 K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130.

The on-screen display controller and formatter (OSDCF) 124 functions as an I/O controller, an on-screen display controller (OSD), and also as a closed-caption data (CCD) VBI data slicer. The VBI is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital convertor (ADC) which digitizes the incoming baseband video and extracts digital information transmitted in the VBIs. As explained more fully below, messages for transmission to the database are transmitted in the VBIs. These messages are transferred to processor 100, which executes a database engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD, which generates a local video that causes the display screen to be displayed on the television screen.

C. SCHEDULING DATA STRUCTURES

As mentioned, the DBE builds a hierarchical database in the RAM. In one embodiment, the hierarchical structure of the database is as depicted in FIG. 1D. As shown, the database is structured internally as a schedule data structures and theme data structures linked by handles and handle tables. Each handle is an index to a handle table which contains pointers to blocks of memory where structures of the database are stored.

The hierarchy for the schedule data structures, in descending order is;

Channel Data Table: contains subscriber unit's list of channels;

Show List: contains time slots for each show scheduled to be broadcast for a channel;

Show Title: contains the title text and show title attributes;

Show Description: contains show's ratings, attributes, and description text.

A channel data table, depicted in FIG. 1E, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

The next data structure in the hierarchy is the show list depicted in FIG. 1F. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of the show list and adding duration values.

The database, when fully constructed, holds a week's worth of show lists for each channel. The days of the week are accessed by incrementing the show list handle by two bytes. The show lists are updated each day at midnight GMT with the show list for the day just completed being deleted and the show list for same day next week being added to the database.

The next data structures in the schedule hierarchy are the show title entries, depicted in FIG. 1G, and the show description entries, depicted in FIG. 1H. For a given show slot, the show title entry and show description entry are accessed utilizing the handles included in the slot. The show title and show description entries are stored in a memory pool divided into blocks. Each show title is identified by a unique 20-bit show identification number (SID), and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry incudes a theme index ID, critics rating, MPAA rating for the show, traits mask bits, year produced, and show description text. Show description entries tend to have a shorter life than show title entries because a description is only valid for a particular episode of a series.

D. SCHEDULE SEARCH

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

E. FAVORITE CHANNEL LISTS

Referring back to FIG. 1E, every entry in the channel data table includes a FAVORITE LINK field. This field includes a link to a next favorite channel and is utilized to form an ordered, linked list of channels in an order determined by the user. The user interface and database engine provide screens to facilitate the ordering and selection of channels to be displayed in the guide. A link to the first channel in an ordered channel list is stored in memory. This link is utilized to access the channel table entry for the most favorite channel.

The FAVORITE LINK in that channel is accessed and utilized to access the channel table entry for the next favorite channel and so on until a designated delimiter value, e.g., 0×00, indicates the end of the favorite channel list. The capability of having more than one favorites list can be supported by having multiple FAVORITE LINK fields stored in each channel table entry.

F. THEME DATA STRUCTURES

A powerful feature of the database is the ability to group shows by theme. The theme IDs stored in the show title and show description entries are utilized to match particular shows to particular themes. For example, a viewer may want to see a listing of all comedy movies.

Each primary category, movies in the example above, has a theme category entry included in a theme category table, depicted in FIG. 1I. A theme category entry includes a theme category ID, a handle for the subcategory handle table, and the theme category name. The theme category ID is used to identify theme sub-categories, comedy in the example above, for this primary category.

There is a theme sub category table, depicted in FIG. 1J, for each primary category. The table contains entries for each theme sub-category contained in a primary theme category. Each table entry includes the theme IDs corresponding to the sub-category entry and the name of the sub-category.

G. THEME SEARCH

When the viewer initiates a search for a particular type of show, for example a comedy movie, each channel is inspected and theme IDs of each show listed are compared to theme IDs stored in the comedy entry of the theme sub-category table corresponding to the movie primary category entry. Information about shows with matching theme IDs is stored in a theme search data structure in a user interface local buffer.

The theme search function requires two calls to the database. The first of these calls initializes the theme search data structure to the first show that matches the theme category for a specific channel entry, including the shows time offset from the search time. The second call will then find the next matching show after a particular offset time, updating the theme search data structure and returning the offset to the next show. The second call will find the next matching show after a particular offset time, updating the search data structure and returning the starting offset of this next matching show.

The basic algorithm for the theme user interface access is:

1. for a given starting time, for each channel entry, find the first show that matches the theme criteria on or during this time and create a list. Keep track of the channels that had matches;
2. sort the list of shows in time order;
3. find the channel with the earliest show in the sorted list;
4. place this earliest show into the user interface search list;
5. for the channel with the earliest show, request the next show that matches the theme criteria and updated offset time;
6. repeat steps 2–4 until all shows have been located or other specified limit is reached (i.e. search may be for a limited number of matches).

The shows for the selected category are then displayed in time order.

H. AD DATA STRUCTURES

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each ad entry includes an ad banner text field, an ad text field, and a pointer to an ad logo, if appropriate. The ad logo includes a graphics file to be displayed with the ad. The ad entries include the ad banner text, and the ad text.

I. BUILDING THE DATABASE

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

Figure 1K:
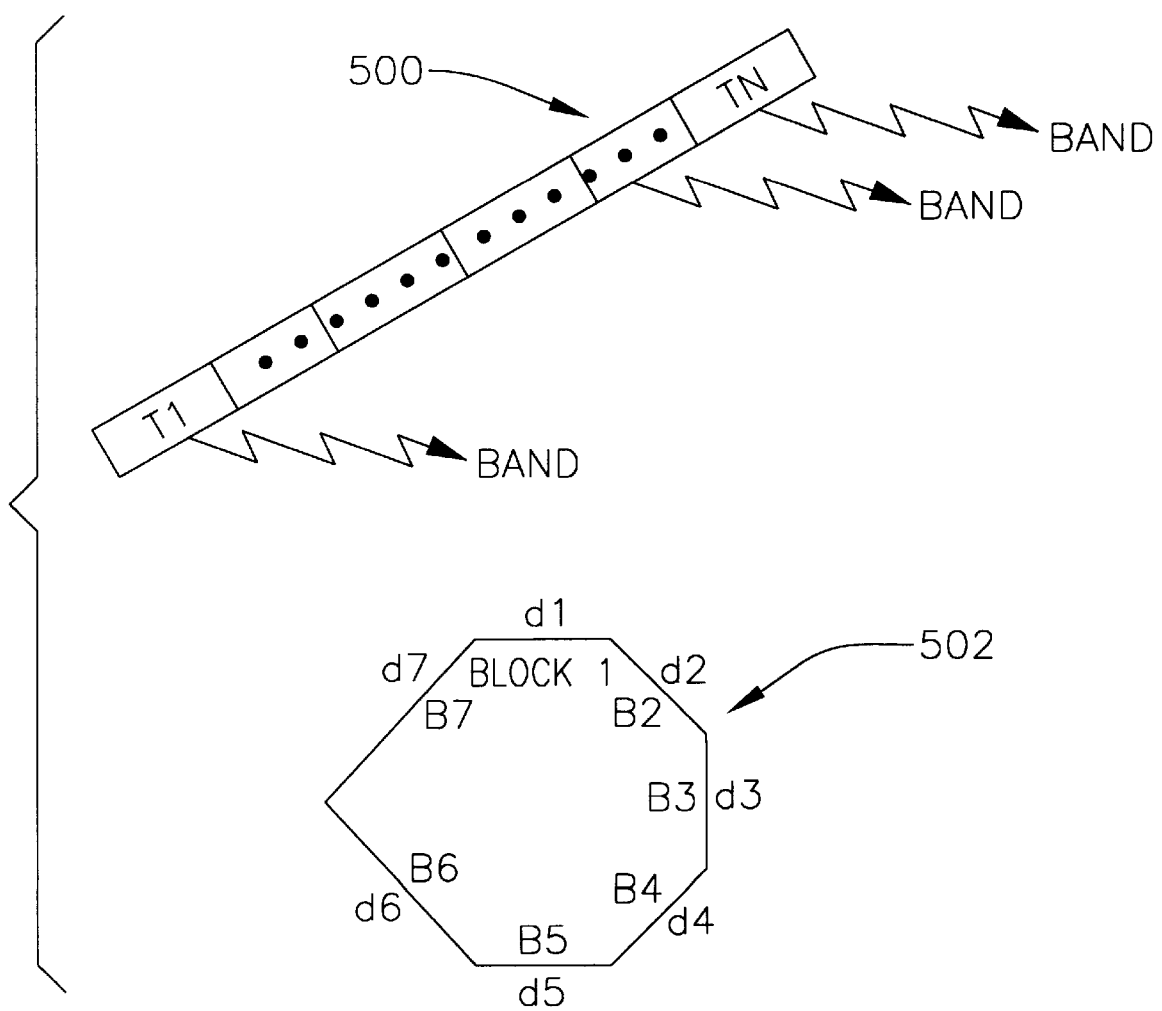
FIG. 1K illustrates a transmission scheme of a satellite that has several transponders simultaneously transmitting on different bands.

The messages may be transmitted to a subscriber unit in various ways. A system for receiving messages in the VBIs of broadcast programming has been described above. In a DBS system the messages may be transmitted in a dedicated bit stream. Alternatively, the database itself may be transmitted in a digital data stream. For example, in DSS, the program guide information is transmitted in blocks of 3 hours of programming for 36 channels. Programming is digitally modulated onto different bands. As depicted in FIG. 1K, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in as a carousel or endless loop so that there may be a delay before a particular time band is received.

When the viewer accesses the guide, the block for that time period is loaded into memory so that the user can interact with the guide. For a future time and different channel there may be time delay. For example, if the current programming block were B1 and the block currently received is B4 the user must wait for blocks B5, B6, and B7 to be transmitted before the current programming can be received and displayed. The viewer would wait for a time delay equal to the sum of time durations for transmitting each block, i.e., d5+d6+d7. If the program guide block is modulated onto a different band the cable box must tune to the band and wait until the desired block is transmitted on the carousel. Hence, if the guide is accessed for future programming, there could be a wait.

For cable, the database is built at the SST head end and sent over land-lines to the cable head end. Cable company sends data anyway it wants, for example, via VBIs, satellite, digital data bit stream, and the like.

J. USER INTERFACE

The guide user interface (GUI) takes remote control commands as its primary input. In one embodiment, a user requests various functions by pressing function buttons on a remote control. In another embodiment, the GUI is utilized with different interactive regions on a displayed screen corresponding to different functions. The user moves the cursor over the interactive region corresponding to a desired function and selects the function to generate a command. The particular form of entering a command is not critical and technology for utilizing voice commands may soon be available.

The user interface receives commands and responds with a requested display screen and by performing the function requested by the command. The function performed may be an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer may move the cursor over to the record interactive region, which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by an on-screen display (OSD) controller based on graphic display commands issued by the database engine. Among the commands needed to draw system display screens are the Erase Screen Command, Draw Rectangle Command, Save Rectangle Command, Restore Rectangle Command, Move Rectangle Commands, Write ASCII String Command, and Draw Channel Icon Command.

Each screen includes areas that are constant (which are based on code and data stored in non-volatile memory), and variable areas such as show titles and descriptions which utilize data stored in the database. As described above in the description of the database engine, the database is structured to facilitate efficient searching for information, generally in the form of ASCII text strings, stored in the database. In addition, graphics files are also being stored in the database to be displayed in windows of the display screen.

K. DESCRIPTION OF ENHANCED FEATURES

Figure 2A:
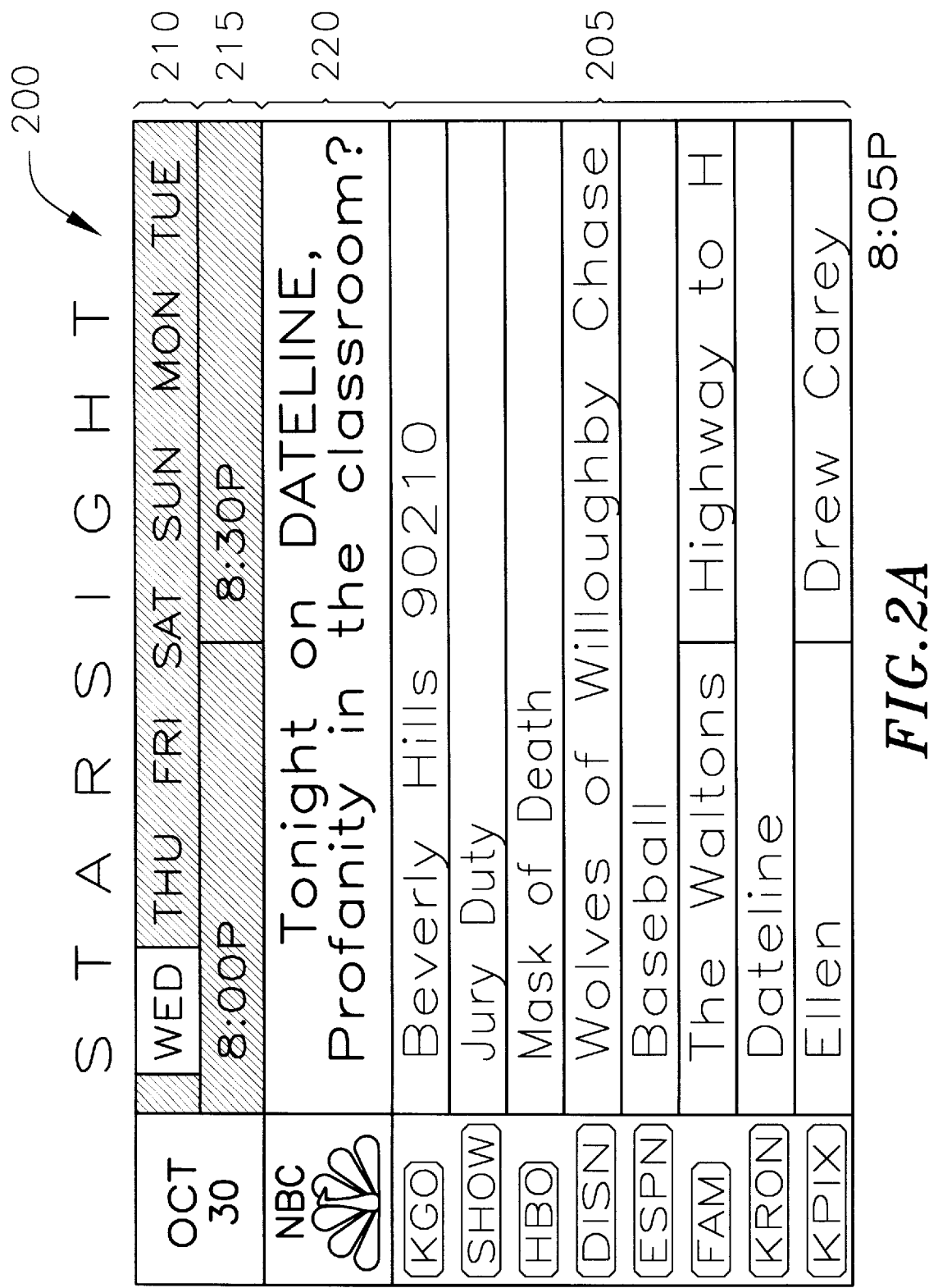
FIG. 2A illustrates a preferred embodiment of a television schedule guide screen according to the present invention.

FIG. 2A is an illustration of a program schedule guide screen 200. As shown, the user may move a cursor across region 210 to move between the different days of the week. In FIG. 2A, the user has selected Wednesday. Hence, the schedule information displayed is for Wednesday, and the time shown is the current time. The system knows what time the user is watching television, and automatically adjusts the cursor to be located on default on a cell that corresponds to the current time. The user may move a cursor across region 215 to move between the different times of the day. Alternatively, the system may include software that allows the user direct access to a particular time slot on the television schedule guide. In such an embodiment, the user may, for example, enter a digit (representing the time), followed by a right arrow key (the future) or left arrow key (the past), and the system will position the user on the time slot selected. In this manner, the user may also designate the start time for recordings. After arriving at the desired time slot, the user may simply select the record button to schedule a recording.

Figure 2B:
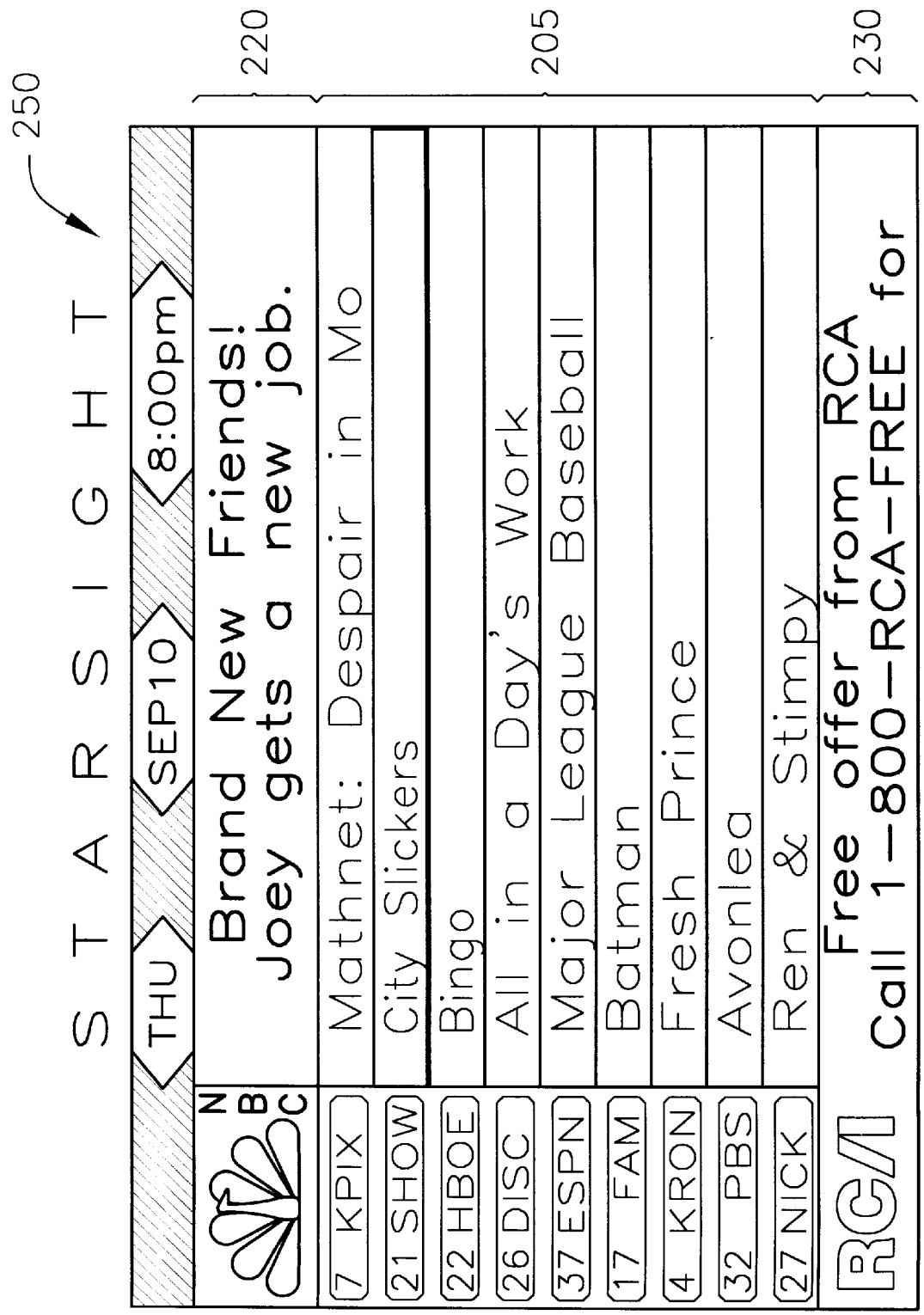
FIG. 2B illustrates another preferred embodiment of a schedule guide screen according to the present invention.

As shown, guide screen 200 also has an information region 220, which is promoting a program that may be on shortly or is currently on. In an alternative embodiment, information region 220 may contain movie titles, and descriptions for local movie theaters. Referring to FIG. 2B, another program guide screen embodiment 250 may be seen as having more than one information region. As shown in FIG. 2B, information region 230 contains product advertisement, however, information region 230 may instead contain movie titles, and descriptions for local movie theaters. In yet another embodiment, the system may provide a separate screen that shows the local movie listings by region and the corresponding movie theaters.

Referring to either FIG. 2A or FIG. 2B, a user may click on one of the cells 220 to obtain descriptions of the program contained in the cell selected. If the program within the cell selected is about to conclude, an information pop-up will show the minutes remaining in the current show. According to the present invention, the system may, instead of or in addition to notifying a user the number of minutes remaining in the current show, inform the user when the next show on the same channel will be on, for example, "In 2 minutes, Seinfeld."

Since the program related information has been stored in a database, a user may alphabetically sort the program titles. As this process could be lengthy, the user may specify that the sorting be performed in the background. In addition, a user may look at a program title on a program guide screen, for example "Ellen," and find all the other times when the show "Ellen" will be on. As discussed, information such as program title, program description, program schedule, and the like are communicated by commands which are subsequently organized into a database. Hence, the system will take the user request for the program title "Ellen," and find matches in the database. When the system displays the matches found, it also displays the times that the program will be on.

Furthermore, the system may search the database for selected themes of programs (e.g., searching for football games) according to user input. The system will either display the result of the search on a separate screen, or the searching may also become a scan feature which continues the search process, i.e., the system will tune to the channel containing a game as it finds the games, thereby allowing a user to flip through football games. In an alternative embodiment, the existing network and subscriber unit software may dynamically add "Themes" to the network. For example, the software, as the occasion arise, may add themes such as Holiday Specials, Election Coverage, Olympics, and the like.

In another preferred embodiment, if the user has scheduled for the recording of a program, the system has the capability of automatically re-scheduling the recording of the program when the program is moved to a new time slot. At the time of the scheduled recording, the system, before activating the VCR, will check that the program that is on is actually the program that the user wishes to record. If the title or program description/ID of the show that is on does not match the title or program description/ID of the show to be recorded, the system will search the database for a match, and upon finding the program to be recorded, the system will determine the new time slot for the program, and will reschedule a recording at the new time.

In addition, the system, at the scheduled program ending time, may check whether the program is still on. If the program is still on, the system will either ask the user whether the user wishes to extend the recording time, or it will automatically extend the recording time. Furthermore, the system may store information related to scheduled recordings in the database. Once every 24 hours, the system may check for information related to scheduled recordings, and provide an information pop-up forming the user how much videotape will be required to accommodate the scheduled recordings. The system may further add a warning pop-up before starting a recording (possibly a few minutes before). This way, the user is notified, and may confirm the tuner change to the channel that corresponds to the program to be recorded.

In another preferred embodiment, the system may keep track of a user's viewing habit by storing such information in the database using, for example, a capture utility that functions like a stopwatch by channel to determine viewing time. This in turn allows the system to keep track of a user's most watched channels, and each week, the system may automatically order the channels on the user's guide screen, typically the channels that the user watches most will be listed first. In another embodiment, the system may also access such information to gather data on the number of viewer, and the amount of viewing time for a particular channel or program for marketing research purposes.

Furthermore, by employing a heuristic model request based on the user's viewing habits, the system can make artificially intelligent decisions about what a user wants to watch, when they want to watch it, and the like. Alternatively, to optimize the use of RAM and reduce hardware costs, the system may utilize an intelligent software that keeps track of what channels are being watched, the result of which is a data collection scheme based on priority of channels, days, and the like.

Currently, the IR devices of the system are set up through user input of a 3 digit code that is selected from the installation manual. An enhancement according to the present invention displays on a screen a scrolling list of brand names, and allows the user to set up the IR devices by selecting a brand from the scrolling list of brand names. In an alternative embodiment, the system could also learn the IR directly by having the user shoot IR at the system, as the system has a IR receptor that would recognize what device the user has by processing the IR signal received.

The system further has a remote that has a device for switching the TV to the input that has the VCR output when a user hits the PLAY button on a remote to play the videotape. For example, in the case of CESA, the CESA tuner also has to be changed to channel 3/4. Sometimes the VCR may be connected to a different TV input than the cable, cable box, or antenna. This means that the user has to pick up a different remote control to switch inputs. Similarly, if a program is recording on the VCR and the user wishes to watch another program, the user has to set the VCR output to TV by setting the TV/VCR switch on the VCR remote to TV. By integrating the switching device in a single remote, the system therefore allows the user to set the TV to the VCR source, or the VCR to the TV source, and the like, using a single remote. Finally, the system stand-alone box may function as a close-captioning decoder, thereby eliminating the need for an additional piece of hardware.

Currently when a new satellite goes up in the sky or an existing one moves, the satellite positioning information is updated in the IRD. The update is usually is done by changing out an EPROM in the IRD. The system according to the present invention allows the system to keep track of this information and downloads it through the VBI. Since the EPROMs in the IRD don't have to be changed out, the system is even more cost effective; furthermore, the need for technical help or service from the system provider is reduced.

The setup of the system may be further simplified through the use of a setup screen that graphically displays how the system is wired. A user may use the information from this visual aid to adjust the system's configuration settings. In addition, multiple channel maps may be included for system setups with more than a single television tuner. This way a user can switch between two sources and have maps that properly define each. An example of this is the output of a cable decoder and a direct feed from the wall.

In another embodiment, the system auto-configures the system installation at the user's site by sending setup data, including step-and-set IR codes, over, for example, the VBI, thereby further simplifying the setup procedure. Alternatively, the setup information may be sent via phone, or the network data stream. Similarly, the system may also transmit schedule data via the telephone modem, out-of-band digital, FM sub-carrier, or paging, instead of transmitting the data over the VBI.

The above description is illustrative and not restrictive. Variations of the invention will become apparent to those skilled in the art upon review of this disclosure. The scope of the invention should, therefore, be determined not with reference to the above description, but instead should be determined with reference to the appended claims along with their full scope of equivalents.

What is claimed is:

1. A television schedule system comprising:

a data input for receiving data;

a memory for storing the received data, the received data including a database of television schedule information, including titles of television shows;

a user input device for receiving commands;

a television monitor; and a processor coupled to the memory, the user input device, and the television monitor, the processor being programmed to utilize the database to display on the television monitor a portion of the television schedule information, including titles, to highlight on the monitor responsive to the user input device the title of a show on a particular channel; and to display on the television monitor the title of the next show on the particular channel, in addition to the highlighted title; and wherein the monitor displays the title of the next show on the particular channel in an information pop-up every time the highlighted show is about to conclude.

2. The system of claim 1, in which the monitor displays in the information pop-up the number of minutes remaining in the show on a particular channel highlighted on the monitor.

3. The system of claim 1, in which the monitor displays in the information pop-up the number of minutes before the next show on a particular channel will be on.

4. A television schedule system comprising:

a data input for receiving data;

a memory for storing the received data, the received data including a database of television schedule information, including titles of television shows;

a user input device for receiving commands;

a television monitor;

a processor coupled to the memory, the user input device, and the television monitor, the processor being programmed to utilize the database to display on the television monitor a portion of the television schedule information, including titles, to highlight on the monitor responsive to the user input device the title of a show on a particular channel; and to display on the television monitor the title of the next show on the particular channel, in addition to the highlighted title; and wherein the processor is programmed to sort alphabetically titles of television shows and the alphabetical sorting is performed in the background without interfering with the displaying of a show on the television monitor.

* * * * *